(12) United States Patent
Boyer et al.

(10) Patent No.: US 8,649,954 B2
(45) Date of Patent: Feb. 11, 2014

(54) SYSTEM FOR CONTROLLING THE ANGULAR POSITION OF STATOR BLADES AND METHOD FOR OPTIMIZING SAID ANGULAR POSITION

(75) Inventors: David Julien Boyer, Epinay Sous Senart (FR); Cedrik Djelassi, Marolles en Hurepoix (FR); Julien Alexis Louis Ricordeau, Paris (FR)

(73) Assignee: SNECMA, Paris (FR)

( * ) Notice: Subject to any disclaimer, the term of this patent is extended or adjusted under 35 U.S.C. 154(b) by 78 days.

(21) Appl. No.: 13/500,347

(22) PCT Filed: Sep. 23, 2010

(86) PCT No.: PCT/FR2010/052000
§ 371 (c)(1),
(2), (4) Date: Apr. 5, 2012

(87) PCT Pub. No.: WO2011/042636
PCT Pub. Date: Apr. 14, 2011

(65) Prior Publication Data
US 2012/0215417 A1 Aug. 23, 2012

(30) Foreign Application Priority Data
Oct. 6, 2009 (FR) ...................................... 09 56958

(51) Int. Cl.
*G06F 19/00* (2011.01)
(52) U.S. Cl.
USPC ............. 701/100; 415/138; 415/160; 60/520; 60/806; 418/260; 56/295; 30/276

(58) Field of Classification Search
USPC .... 701/100; 416/20 A, 20 R, 170 R, 95, 148; 415/138, 160; 60/520, 806; 418/260; 92/173; 56/295; 30/276
See application file for complete search history.

(56) References Cited

U.S. PATENT DOCUMENTS

| 4,184,327 A | | 1/1980 | Cornett et al. | |
| 4,261,168 A | * | 4/1981 | Grigorian et al. | 60/39.092 |
| 4,556,801 A | * | 12/1985 | Gervasio et al. | 290/44 |
| 4,609,165 A | * | 9/1986 | Logan et al. | 244/17.19 |

(Continued)

FOREIGN PATENT DOCUMENTS

| EP | 1 036 924 | 9/2000 |
| EP | 1 286 031 | 2/2003 |
| GB | 2 009 858 | 6/1979 |

OTHER PUBLICATIONS

International Search Report issued on Feb. 1, 2011 in PCT/FR10/52000 filed on Sep. 23, 2010.

*Primary Examiner* — McDieunel Marc
(74) *Attorney, Agent, or Firm* — Oblon, Spivak, McClelland, Maier & Neustadt, L.L.P.

(57) ABSTRACT

A system for controlling angular position of stator blades including: a mechanism for calculating a set angular position of the blades according to one of speeds; and a module for correcting the set position including: a mechanism for determining the angular position of the blades; a mechanism for measuring fuel flow rate of the turbine engine; a memory unit in which consecutive angular positions of the blades are combined with the fuel flow rates of the turbine engine measured at the angular positions; and a mechanism for determining a correcting angle according to the difference between the fuel flow rates measured between two consecutive angular position of the blades. A method for optimizing the common angular position can utilize the system.

8 Claims, 5 Drawing Sheets

(56) References Cited

U.S. PATENT DOCUMENTS

| | | | |
|---|---|---|---|
| 4,874,289 A * | 10/1989 | Smith et al. | 415/150 |
| 5,622,133 A * | 4/1997 | Sinitsyn et al. | 114/272 |
| 5,715,162 A * | 2/1998 | Daigle | 701/99 |
| 5,836,795 A * | 11/1998 | Kaul et al. | 440/66 |
| 6,164,057 A | 12/2000 | Rowen et al. | |
| 2004/0011020 A1 | 1/2004 | Nomura et al. | |
| 2005/0262849 A1 | 12/2005 | Nomura et al. | |
| 2010/0166562 A1* | 7/2010 | Boyer | 416/219 R |

* cited by examiner

SYSTEM FOR CONTROLLING THE ANGULAR POSITION OF STATOR BLADES AND METHOD FOR OPTIMIZING SAID ANGULAR POSITION

BACKGROUND OF THE INVENTION

1. Field of the Invention

The invention relates to the field of gas turbine engines comprising at least two spools and comprising one or more stator stages in which the blades are variable-pitch blades.

The object of the invention is to optimize the angular position of said stator blades so as to reduce the fuel consumption when the turbine engine operates at steady speed. "Steady speed" means an engine speed at which the thrust provided by the engine is substantially constant over time.

2. Description of the Related Art

As an example, each spool of a twin-spool gas turbine engine comprises at least one compressor and one turbine mounted downstream of said compressor. By convention, in the present application, the terms "upstream" and "downstream" are defined relative to the direction of travel of the air in the turbine engine. Traditionally, a compressor comprises several rotor stages in order to accelerate and compress an air stream travelling from upstream to downstream in the engine. In order to straighten out the air flow after acceleration, a stator stage is arranged directly at the exit of each rotor stage.

A stator stage takes the form of a fixed wheel, extending axially, with radial stator blades mounted on the periphery of the stator wheel. In order to optimize the straightening of the air flow by the stator stages downstream of the rotor stages, it is possible to modify the angular orientation of the stator blades, the blades being called variable-pitch blades. Accordingly, the turbine engine comprises a system for controlling the angular position of the stator blades of the compressor.

Conventionally, with reference to the schematic FIG. 1A, the angular position of the stator blades of a twin-spool turbine engine M is determined mainly as a function of the rotation speed of the high-pressure rotor N2 and of the temperature at the entrance of the compressor $T_{25}$. Accordingly, the control system comprises means 20 for computing a set value $VSV_{CAL}$ of the angular position of the blades on each stator wheel for a given rotation speed of the rotor N2. The computed set value $VSV_{CAL}$ is transmitted to a control actuator 6 arranged to modify the current angular position of the stator blades of the turbine engine M.

The computing means 20 are programmed by mathematical laws that have been previously determined in order to suit an "average" engine which is neither too recent (new engine straight out of the factory), nor too "worn" (ready for overhaul).

In practice, the real engine does not correspond to the "average" engine for which the mathematical laws have been computed. The mathematical laws of the current systems take account of the margin requirements of the engine (margins of robustness to aging, margins of dispersion from engine to engine, margins of fouling, etc.). The result of this is that the angular position of the blades is not optimized for the real engine but robust both for a new or for a degraded engine.

A solution would be to modify the mathematical laws so that the parameters of engine wear and the dispersions between engines are taken into account. However, this solution is difficult to apply, the parameters being numerous and difficult to model.

BRIEF SUMMARY OF THE INVENTION

In order to remedy these drawbacks, the applicant proposes a system for controlling the angular position of variable-pitch stator blades of a turbine engine compressor comprising at least two spools, each with a rotation speed (N1 and N2 respectively), for a turbine engine operating at steady speed, the system comprising:

means for computing an angular set position of the blades as a function of one of the speeds (N1, N2) and a module for correcting the set position comprising:
  means for determining the angular position of the blades;
  means for measuring the fuel flow rate of the turbine engine;
  a memory in which the successive angular positions of the blades are associated with the fuel flow rates of the turbine engine measured at said angular positions; and
  means for determining a correcting angle, said means being arranged to compute the correcting angle as a function of the difference between the fuel flow rates measured between two successive angular positions of the blades.

The system according to the invention advantageously makes it possible to determine an angular position of the blades that optimizes the consumption of fuel by the turbine engine. The applicant has determined that the fuel flow rate of the turbine engine, at a given steady speed, is a function of the angular position of the blades and that this function has a minimum locally. In other words, by locally varying the angular position of the blades, it is possible to determine to what extent it is necessary to modify the current angular position of the blades to limit the fuel flow rate. The correction module of the invention makes it possible to supplement a conventional system for controlling the angular position of the blades in order to improve the performance of the engine at a given steady speed.

Unlike the prior art, in which the law for determining the angular position of the blades is static for all the engines without taking account of the dispersion of the engine parameters or its wear parameters, the system according to the invention allows an adjustment of the angular position of the blades as a function of the state of the engine. Instead of listing all the parameters of wear or of dispersion of the engine and obtaining multiple complex mathematical laws, the applicant measures directly the impact of a variation in angle on the consumption of fuel.

By virtue of the invention, the theoretical set position computed on the basis of a mathematical model corresponding to an "average" engine is corrected. Such a system may be simply incorporated into an existing turbine engine. This new formulation of the problem to be solved makes it possible to determine an optimum value of angular position of the blades.

Preferably, the system comprises an adder arranged to compute an optimized set position by adding the correcting angle to the set angular position. This therefore corrects the set value to take account of the consumption of fuel.

Also preferably, the system comprises an actuator arranged to control the angular position of the blades as a function of the optimized set position. The current angular position is thus modified by the actuator to "follow" the optimized set position.

Also preferably, the correction module comprises means for checking the state of the turbine engine and means for inhibiting the correction of the current angular position of the blades, the inhibition means being activated if the state of the turbine engine is not suitable for a correction of the angular position of the blades.

The inhibition means are activated if the state of the turbine engine is not suitable for a correction of the angular position of the blades. The inhibition means make it possible, on instruction from the checking means, to prevent a modification of the angular position of the blades which could endanger the turbine engine or which would not be suitable for its operating state.

Preferably, the correction module comprises means for limiting the value of the correcting angle, said means being arranged to limit the value of the correcting angle in order to remain within a risk-free operating range.

The invention also relates to a turbine engine comprising a control system as described above.

The invention also relates to a method for optimizing the current angular position of stator blades of a turbine engine compressor comprising at least two spools each rotating at a speed (N1; N2), for a turbine engine operating at steady speed, a method in which:

a) the reference fuel flow rate of the turbine engine is determined at a reference angular position of the blades;
b) the current fuel flow rate of the turbine engine is determined at the current angular position of the blades;
c) a correcting angle is computed as a function of the difference between the reference fuel flow rate and the current fuel flow rate so as to reduce the fuel flow rate;
d) said correcting angle is added to a previously computed set position so as to obtain an optimized set position;
e) the current angular position of the blades is modified so that it corresponds to the optimized set position.

Preferably, steps (a) to (e) are iterated by using as the reference angular position in step (a) the current angular position of step (b) of the previous iteration.

Advantageously this makes it possible to optimize the angular position of the blades "step by step" which ensures an optimization that is precise and has no harmful side effects such as the occurrence of transients.

Again preferably, the correcting angle is computed by an optimization method, preferably by a method of steepest descent of the fuel function F defining the fuel flow rate of the turbine engine relative to the angular position of the blades.

The fuel function F allows a local minimum which ensures the convergence of the optimization method. It may occasionally be convex which ensures the existence of an optimum angular position.

Still preferably, the value of the correcting angle is limited in order to remain within a risk-free operating range (overspeed, surge, temperature rise, etc.).

According to another embodiment of the invention, the state of the engine is checked and the modification of the current angular position of the blades is inhibited if the state of the turbine engine is not suitable for a correction of the angular position of the blades.

BRIEF DESCRIPTION OF THE SEVERAL VEIWS OF THE DRAWINGS

The invention will be better understood with the aid of the appended drawing in which.

DETAILED DESCRIPTION OF THE INVENTION

Figure 1A:
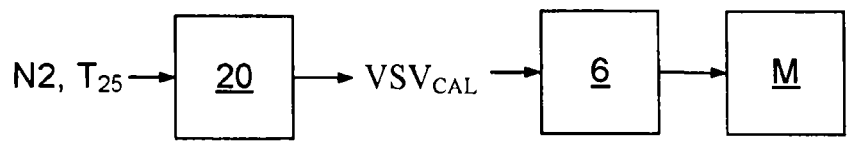
FIG. 1A represents a system for controlling the angular position of the blades according to the prior art.
Figure 1B:
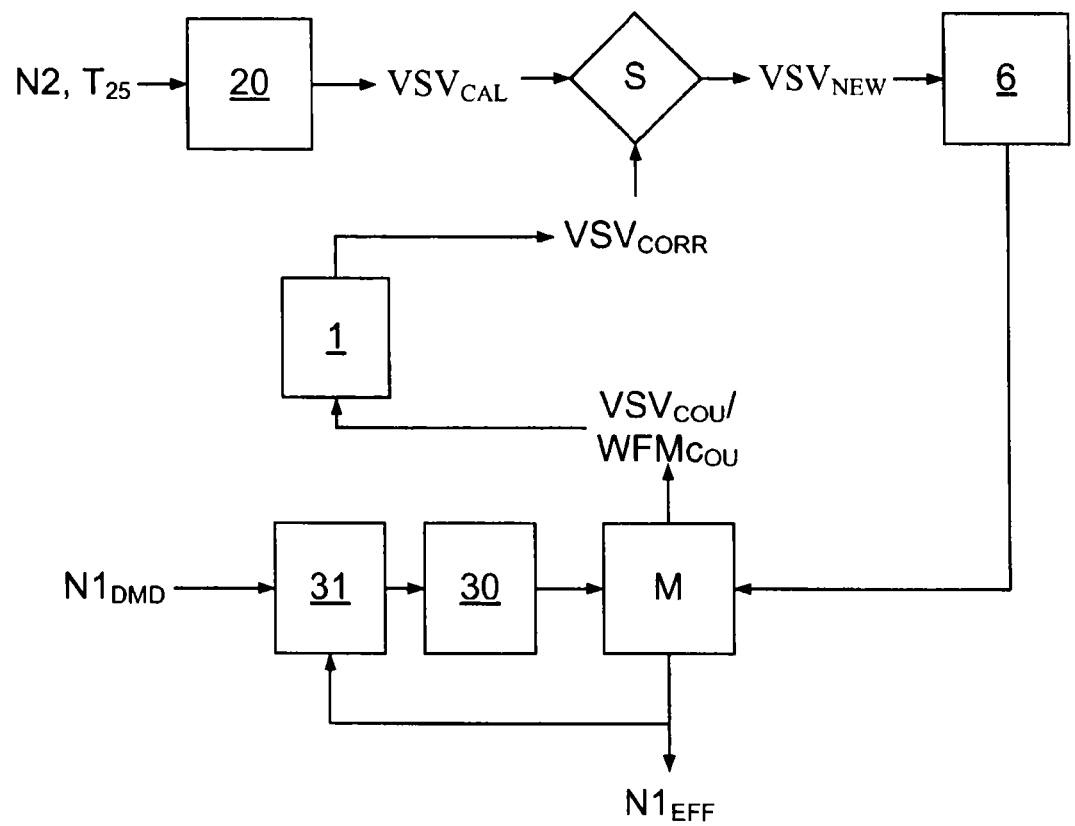
FIG. 1B represents a system for controlling the angular position of the blades with a module for correcting the angular position according to the invention.

A system for controlling the angular position of the stator blades of the HP compressor of a turbine engine according to the invention is shown in FIG. 1B for a twin-spool engine; a low-pressure LP spool with a rotation speed N1 and a high-pressure HP spool with a rotation speed N2. With the aid of a throttle, the engine is controlled by indicating to it the desired thrust; the thrust is directly linked to the speed of the low-pressure LP spool. Thus, a thrust setting imposes a rotation speed setting $N1_{DMD}$ of the LP spool. For the purposes of clarity, the reference N1, relating to the rotation speed of the LP spool, will be used also for the engine thrust because of the direct link between these two parameters. Similarly, the reference N1 may correspond to other parameters having a direct link with the engine thrust, in particular the parameter EPR corresponding to "Engine Pressure Ratio" that is well known to those skilled in the art.

Conventionally, the turbine engine comprises means 20 for computing the set angular position of the stator blades $VSV_{CAL}$ as a function of the rotation speed N2 of the high-pressure body and of the temperature of the high-pressure (HP) spool $T_{25}$. The computing means 20 are programmed by mathematical laws well known to those skilled in the art that make it possible to compute a set angular position $VSV_{CAL}$ as a function of the rotation speed N2 of the HP spool.

The control system according to the invention also comprises a module 1 for correcting the set position $VSV_{CAL}$ of the stator blades of the engine M. The correction module 1 makes it possible to determine a correcting angle $VSV_{CORR}$ optimizing the consumption of fuel. The control system also comprises an adder S arranged to receive as an input the computed setting value $VSV_{CAL}$ and the correcting angle $VSV_{CORR}$ in order to transmit as an output an optimized setting value $VSV_{NEW}$ corresponding to the total of its two input parameters ($VSV_{CORR}$, $VSV_{CAL}$). The control system also comprises a control actuator 6 which modifies the current angular position of the blades $VSV_{COU}$ as a function of the optimized setting value $VSV_{NEW}$.

Still with reference to FIG. 1B, the control system comprises a module 31 for estimating the fuel necessary to maintain the rotation speed N1, also called the correcting network, which receives as an input the speed setting $N1_{DMD}$ corresponding to a desired rotation speed, that is to say to a desired level of thrust. The control system also comprises a fuel control device 30 controlled by the correcting network 31 and capable of modifying the fuel flow rate as a function of the effective rotation speed $N1_{EFF}$ of the engine, measured for example by a tachometric sensor.

If the fuel flow rate supplied to the engine M does not make it possible to achieve the requested thrust ($N1_{EFF}$ is lower than $N1_{DMD}$), the correcting network 31 determines the command to be applied to the fuel control device 30 to increase the fuel flow rate supplied to the engine M and thus compensate for the difference between the desired speed $N1_{DMD}$ and the effective speed $N1_{EFF}$.

Figure 2:
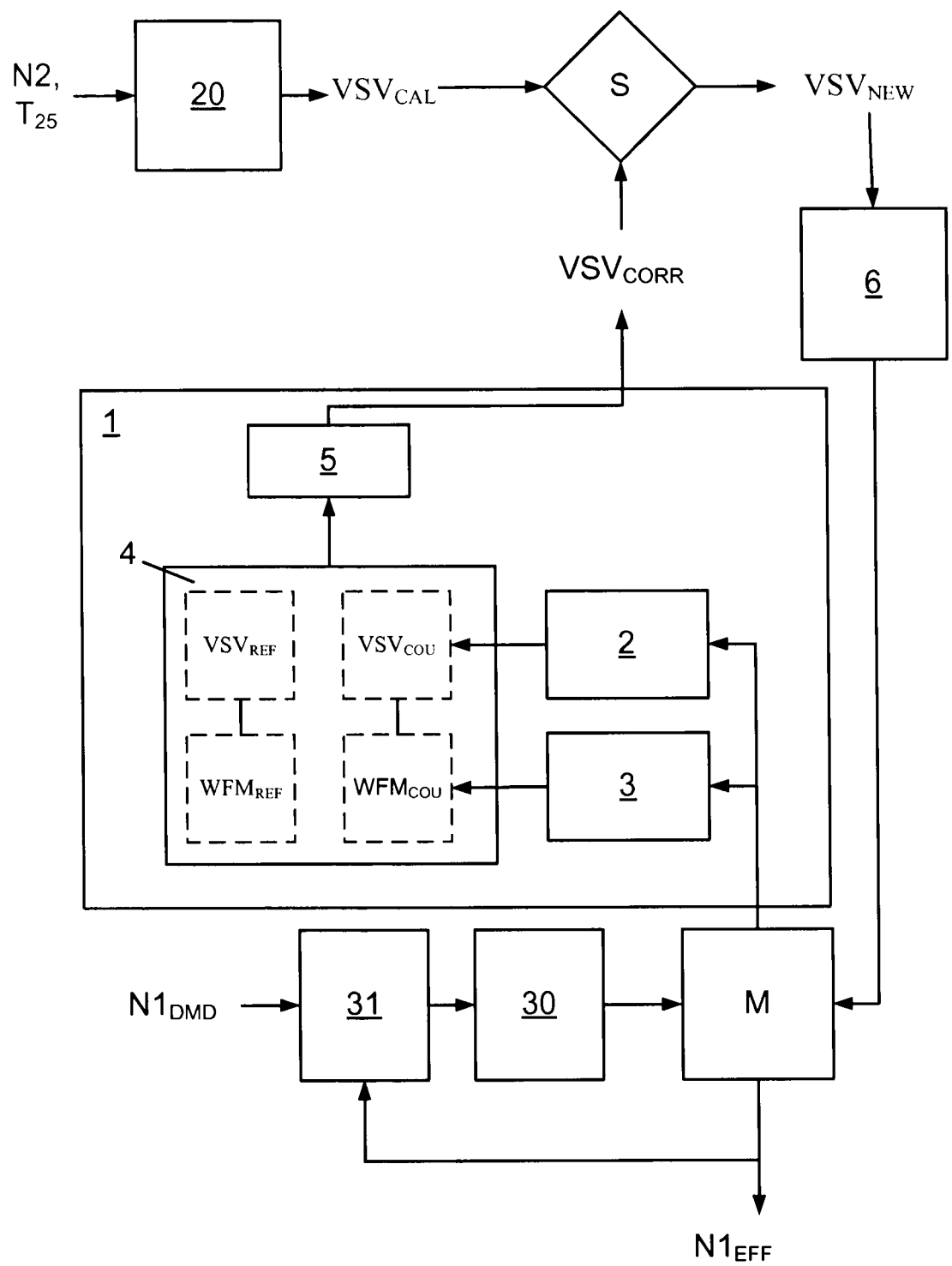
FIG. 2 represents a schematic diagram of a first embodiment of a system of angular control of the stator blades of a turbine engine arranged to compute a correcting angle.

With reference to FIG. 2, the correction module 1, according to a first embodiment of the invention, comprises means 2 for determining the angular position of the blades VSV, said means being known per se, taking the form for example of position sensors, and means 3 for determining the fuel flow rate of the turbine engine WFM at a given angular position of the blades VSV. These means 3 for determining the flow rate may be either direct—they take the form for example of a sensor mounted upstream of the injectors of the turbine engine combustion chamber—or indirect—the linear position of an element closing off the section of passageway of a fuel pipe of the turbine engine is measured for example, the dimensions of the section being known. As a general rule, these determination means 2, 3 are activated continuously in order to constantly monitor the angular position of the blades and the fuel consumption.

The correction module 1 also comprises a memory 4 in which the successive angular positions of the blades VSV are associated with the fuel flow rates of the turbine engine WFM measured at said angular positions VSV. Over time, the memory 4 of the correction module 1 is supplemented by said determination means 2, 3. In practice, the memory 4 retains only a certain number of value pairs (VSV, WFM), the oldest pairs being replaced by more recent pairs. As an example, the memory 4 comprises at least two pairs: a pair of current values ($VSV_{COU}$, $WFM_{COU}$) and a pair of previous values, called reference values ($VSV_{REF}$, $WFM_{REF}$).

In the present case, there is a limitation to the operation of the engine at a steady speed, the thrust supplied by the engine being substantially constant over time. As an example, in steady operation, the rotation speed N1 is constant or the parameter EPR is constant. At steady speed, it is advantageously possible to monitor the change in the fuel flow rate $WFM_{COU}$ as a function of the value of the angle of the stator blades $VSV_{COU}$ by analyzing the discrete function, hereinafter called the fuel function F, defined by the pairs of the memory 4 of the control system 1.

Figure 5:
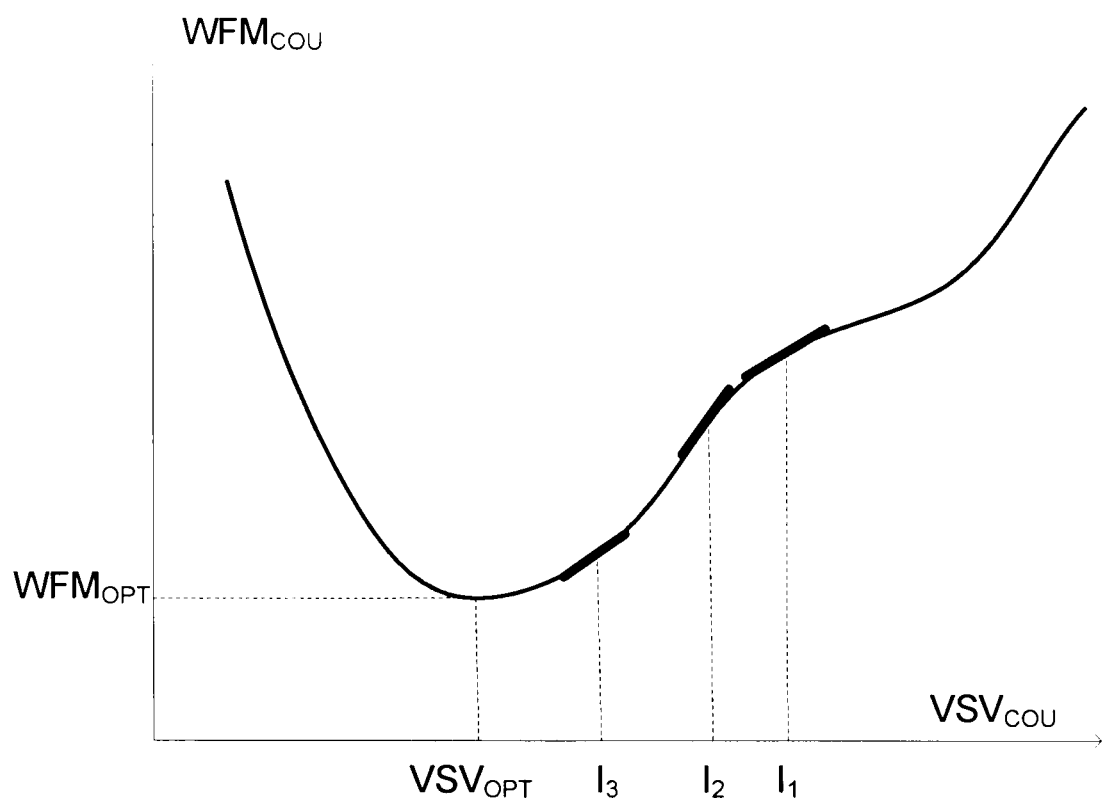

For an operation of the turbine engine at constant rotation speed N1, also called "iso N1", the applicant has studied the fuel function F, defining the fuel flow rate $WFM_{COU}$ relative to the angular position of the blades $VSV_{COU}$, and has determined that this fuel function F is locally convex and therefore that there is an angular position of the blades for which the consumption of fuel is lowest, this optimum angular position being referenced $VSV_{OPT}$. FIG. 5 shows the fuel function F and the optimum angular position for a determined steady speed of the engine.

The angular position $VSV_{OPT}$ is called the optimum position of the engine for two reasons. First, it is optimum with respect to the determined steady speed of the engine, the optimum angular position varying as a function of the given speed. Secondly, it is optimum with respect to the engine as such, the angular position $VSV_{OPT}$ being defined "to suit" for the engine by naturally taking account of its state of wear and of the manufacturing dispersion. In other words, according to the manufacturing margins and the variations associated with the installation, a given engine does not have exactly the same behavior as another engine of the same series, resulting in that each engine has an optimum angular position $VSV_{OPT}$ that is specific to it.

The correction module 1 also comprises means 5 for determining a correcting angle $VSV_{CORR}$, said means being arranged to compute the correcting angle $VSV_{CORR}$ as a function of the difference between the fuel flow rates measured between two successive angular positions of the blades. In other words, the correcting angle $VSV_{CORR}$ is not computed by analysis of the intrinsic parameters of the engine but by optimization of the desired result so as to obtain the lowest possible fuel consumption $WFM_{OPT}$.

Accordingly, the means 5 for determining the correcting angle $VSV_{CORR}$ are arranged to determine a local minimum of the fuel function F at iso N1 and this is done knowing only a few values of this function (the last successive angular positions). The means 5 for determining the correcting angle $VSV_{CORR}$ are in this instance programmed by an optimization function, the function of which is to determine the correcting angle $VSV_{CORR}$ while limiting its value. Specifically, if the current angular position of the blades $VSV_{COU}$ is modified by a correcting angle of $VSV_{CORR}$ with too high a value, transients occur in the engine which could damage it.

The principle of the optimization consists in locally having the current angular position of the blades vary, in measuring the impact of this angular variation on the effective fuel flow rate in order to learn a lesson therefrom on how to modify the current angular position.

The optimization function according to the invention therefore makes it possible to improve the efficiency of the engine in a safe way by limiting the occurrence of transients. The optimization function will be described for a method of steepest descent but other optimization methods would also be suitable, such as an optimization by the least squares method etc. The method of steepest descent makes it possible to optimize the angular position in a simple manner.

With the pairs of values ($VSV_{COU}$, $WFM_{COU}$; $VSV_{REF}$, $WFM_{REF}$) stored in the memory 4, the method of steepest descent computes the value of the gradient of the fuel function F at the current angular position of the blades $VSV_{COU}$ relative to its previous angular position $VSV_{REF}$. The direction of convergence of the fuel function F is thus deduced therefrom. By linear optimization, a correcting angle $VSV_{CORR}$ is computed as a function of the value of the gradient at the current angular position $VSV_{COU}$ and of a saturated increment SAT1 and of a convergence rate $\mu$, the convergence rate $\mu$ being chosen so as to produce a compromise between a rapid convergence to the optimum angular position $VSV_{OPT}$ and a protection against the occurrence of transients in the turbine engine.

By virtue of the optimization function, the value of the correcting angle $VSV_{CORR}$ is deduced therefrom which must be added to the set position $VSV_{CAL}$ in order to obtain the optimized setting value $VSV_{NEW}$. The control actuator 6 makes it possible to modify the current angular position of the blades $VSV_{COU}$ in order correspond to the optimized set position $VSV_{NEW}$. The optimized set position $VSV_{NEW}$ does not necessarily correspond to the optimum angular position $VSV_{OPT}$ because a considerable modification of the current angular position $VSV_{COU}$ could cause the compressor to surge. Preferably, the optimization is carried out progressively, by iterations.

By virtue of the optimization of the angular position of the blades, the engine is adjusted to a given speed with a lower fuel flow rate. With reference to FIG. 1B, the fuel control device 30 commands the correcting network 31 to retain the same speed N1 despite the modification to the behavior of the HP spool due to the modification of the current angular position of the blades. This therefore produces fuel savings.

Figure 4:
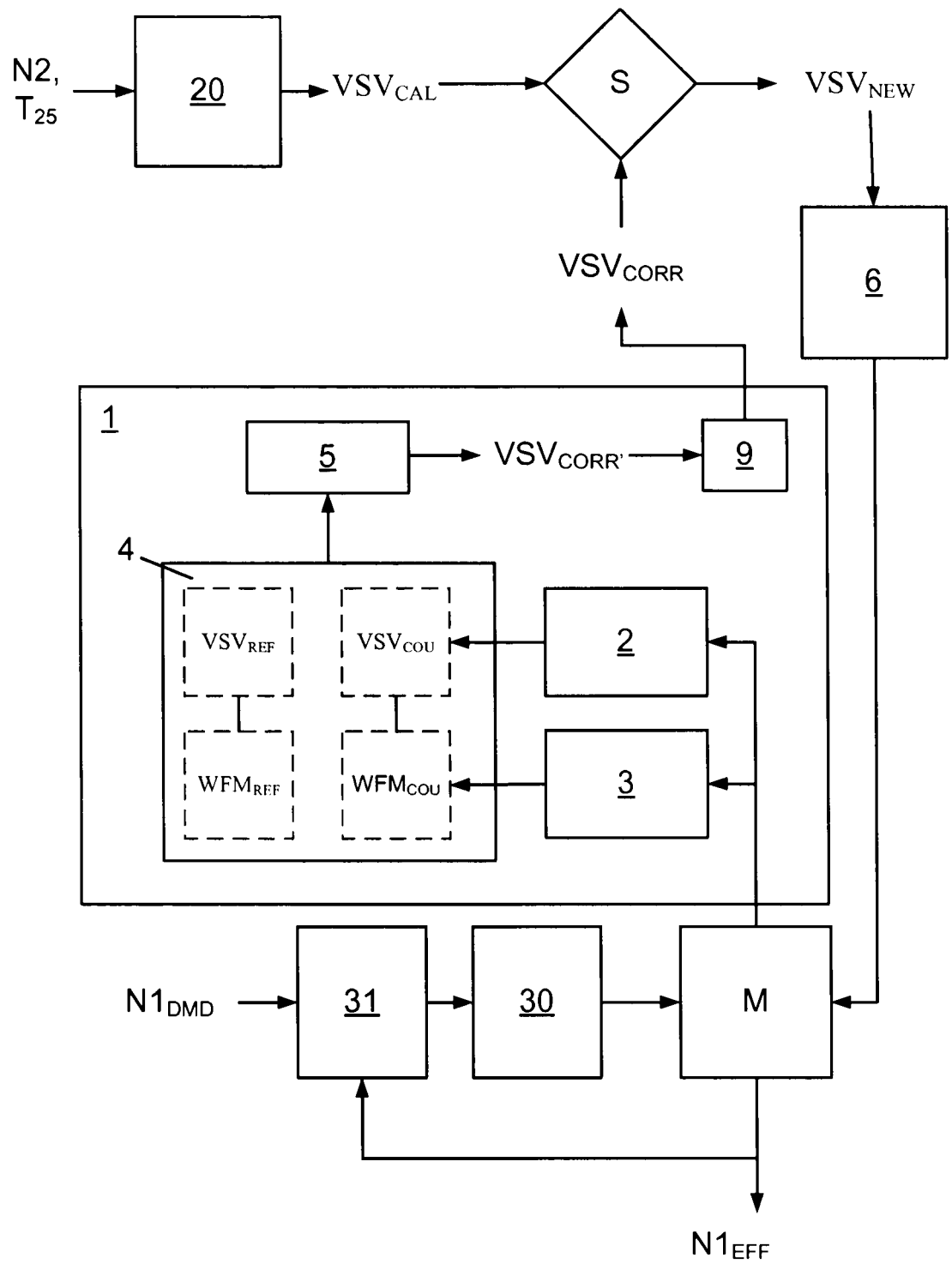
FIG. 4 represents a schematic diagram of a third embodiment of a control system with means for limiting the value of the correcting angle and FIG. 5 is a curve representing the change in the fuel flow rate of the engine as a function of the angular position of the stator blades of the engine, for a determined steady speed of the engine.

Preferably, with reference to FIG. 4, the correction module 1 comprises means 9 for limiting the value of the correcting angle $VSV_{CORR}$ arranged to limit the correcting angle by a threshold of gradient saturation SAT2 so as to prevent the occurrence of oscillations during a modification of the current angular position of the blades $VSV_{COU}$. This also makes it possible to check the speed of convergence of the optimization method. The saturation function SAT2 and the saturated increment SAT1 may be used together or independently.

As an example, the steepest descent optimization method may obey the mathematical relation reproduced below:

$$VSV_{CORR}(t) = -SAT1[\text{Gradient } F(VSV_{COU}) \times \mu] + VSV_{CORR}(t-1)$$

$$VSV_{CORR}'(t) = \text{sign} VSV_{CORR}(t)) \cdot \min(|VSV_{CORR}(t)|, SAT2)$$

$$VSV_{NEW}(t) = VSV_{CAL}(t) + VSV_{CORR}'(t)$$

In order to initiate the optimization procedure, it may be necessary to very slightly modify the current angular position of the blades in order to carry out the optimization and begin the process. It is then said that the optimization method is initiated by "excitation" of the system. The initialization may also result from a mathematical model indicating the direction of variation of the angular position of the blades VSV leading to a reduction in the fuel flow rate WFM.

Figure 3:
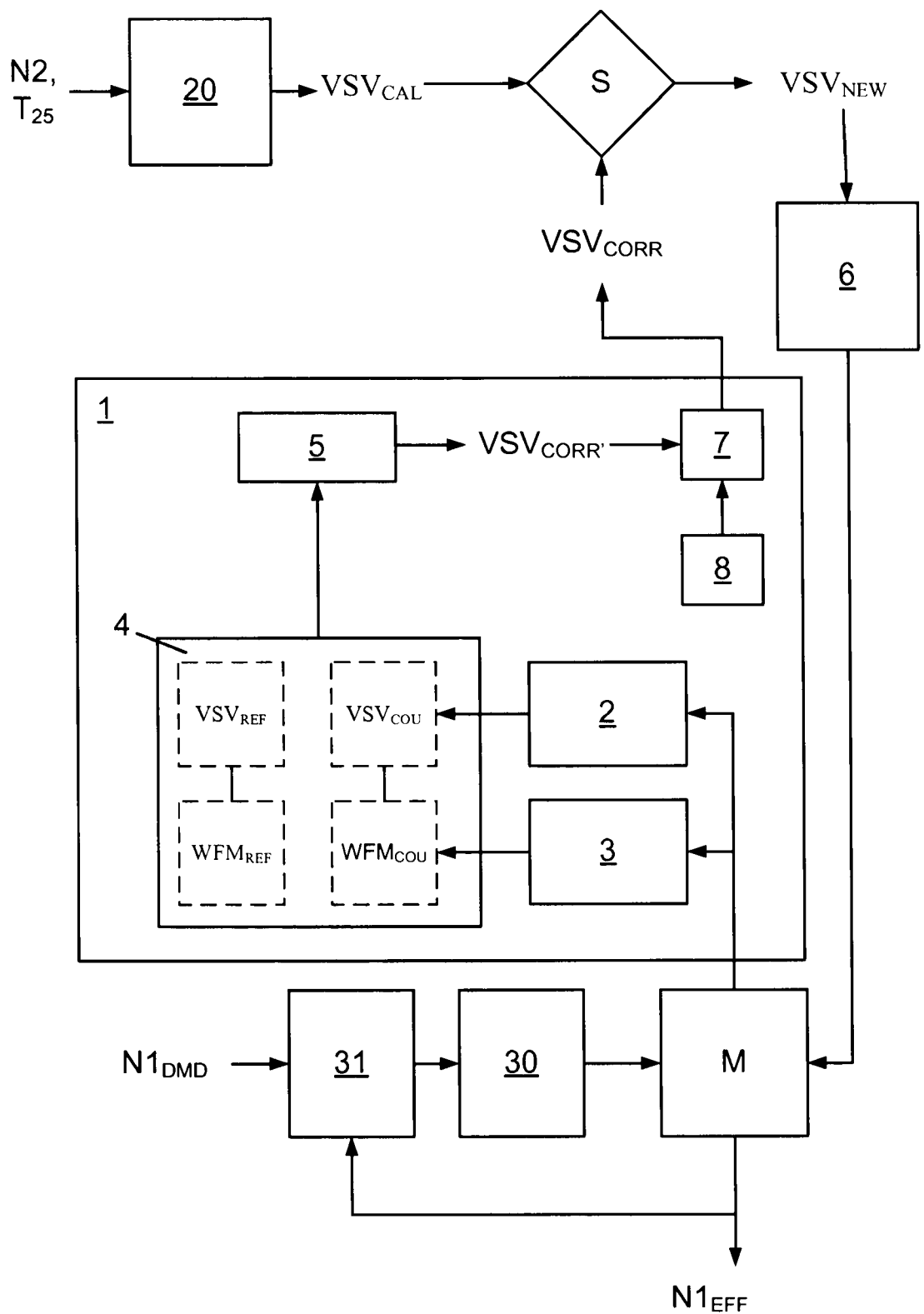
FIG. 3 represents a schematic diagram of a second embodiment of a control system with correction inhibition means.

According to a preferred embodiment of the invention, with reference to FIG. 3, the correction module 1 comprises inhibition means 7 arranged to cancel out the value of the computed correcting angle $VSV_{CORR}$ by the means 5 for determining the correcting angle. This makes it possible to prevent a correction of the angular position of the blades by the control actuator 6 when the engine is not operating at steady speed.

It goes without saying that the limitation means 9 and the inhibition means 7 could be used in one and the same control system 1.

In this embodiment, the inhibition means 7 take the form of an "OR" logic gate connected to means 8 for measuring the state of the engine, that is to say "its state of health". As an example, the means 8 for measuring the state of the engine comprise:

means for storing events of the surge type. If a surge has been detected during the life of the turbine engine, the logic is inhibited by the inhibition means 7.

means for measuring the temperature margin of the exhaust gases, called the EGT "Exhaust Gas Temperature" margin parameter, relative to a predetermined margin. If there is an insufficient margin, the logic is inhibited by the inhibition means 7.

means for estimating the state of the compressor of the turbine engine by sensors for measuring the coefficients of flow rate and efficiency of the high-pressure compressor. These coefficients, representing the state of the engine, are compared with predetermined threshold values relative to a "healthy" engine, that is to say an engine in good condition. If the threshold is exceeded, the logic is inhibited by the inhibition means 7.

means for measuring the stability of the engine, said means being arranged to measure values such as for example the speed of the LP spool ($N1_{EFF}$), the speed of the HP spool (N2) and their variance. In the event of a transient, the logic is inhibited by the inhibition means 7.

Similarly, if the pilot of the aircraft wishes to accelerate or decelerate the engine by acting on the throttle, the correction is inhibited and the angular position of the blades is not optimized. This check is carried out by means, not shown, for monitoring engine transients.

The invention also relates to a method for optimizing the current angular position of stator blades of a turbine engine compressor comprising at least two spools each rotating at a speed, for a turbine engine operating at steady speed, a method in which:

a) the reference fuel flow rate $WFM_{REF}$ of the turbine engine is determined at a reference angular position $VSV_{REF}$ of the blades;

b) the current fuel flow rate $WFM_{COU}$ of the turbine engine is determined at the current angular position $VSV_{COU}$ of the blades;

c) a correcting angle $VSV_{CORR}$ is computed as a function of the difference between the reference fuel flow rate $WFM_{REF}$ and the current fuel flow rate $WFM_{COU}$ so as to reduce the fuel flow rate;

d) the correcting angle $VSV_{CORR}$ is added to the set position $VSV_{CAL}$ so as to compute an optimized set position $VSV_{NEW}$;

e) the current angular position $VSV_{COU}$ of the blades is modified so that it corresponds to the optimized set position $VSV_{NEW}$.

Preferably, steps (a) to (e) are iterated by using as the reference angular position $VSV_{REF}$ in step (a) the current angular position $VSV_{COU}$ of step (b) of the previous iteration.

As shown in FIG. 5, the angular position of the blades $VSV_{COU}$ is optimized after each iteration ($I_1$, $I_2$, $I_3$) so as to minimize the consumption of fuel. Advantageously this makes it possible to come close to the optimum angular position $VSV_{OPT}$ optimizing the consumption of fuel at a given speed, while preventing the occurrence of transients likely to disrupt the engine in the event of a sudden change in the angular position of the blades.

Again preferably, the stability of the engine speed is tested and the modification of the current angular position $VSV_{COU}$ of the blades is inhibited if the stability test fails, as described in the control system according to the invention.

The invention claimed is:

1. A system for controlling angular position of variable-pitch stator blades of a turbine engine compressor including at least two spools, each with a rotation speed, for a turbine engine operating at steady speed, the system comprising:
   circuitry configured to
      compute an angular set position of the blades as a function of one of rotation speeds;
      determine angular positions of the blades;
      measure fuel flow rate of the turbine engine;
      associate successive angular positions of the blades with the fuel flow rates of the turbine engine measured at the angular positions;
      determine a correcting angle;
      compute a correcting angle as a function of the difference between the fuel flow rates measured between two successive angular positions of the blades; and
      compute an optimized set position by adding the correcting angle to the set angular position; and
   an actuator configured to control the angular position of the blades as a function of the optimized set position.

2. The system as claimed in claim 1, wherein the circuitry is further configured to check a state of the turbine engine and to inhibit the correcting of the current angular position of the blades, the correcting of the current angular position of the blades being inhibited if the state of the turbine engine is not suitable for a correction of the angular position of the blades.

3. The system as claimed in claim 1, the circuitry is further configured to limit a value of the correcting angle.

4. A turbine engine comprising a control system as claimed in claim 1.

5. A method for optimizing a current angular position of stator blades of a turbine engine compressor including at least two spools each rotating at a speed, for a turbine engine operating at steady speed, the method comprising:
   a) determining, by a processor, a reference fuel flow rate of the turbine engine at a reference angular position of the blades;

b) determining, by the processor, a current fuel flow rate of the turbine engine at a current angular position of the blades;
c) computing, by the processor, a correcting angle as a function of the difference between the reference fuel flow rate and the current fuel flow rate so as to reduce the fuel flow rate;
d) adding, by the processor, the correcting angle to a previously computed set position so as to obtain an optimized set position;
e) modifying, by the processor, the current angular position of the blades so that it corresponds to the optimized set position.

6. The method as claimed in claim 5, wherein,
(a) to (e) are iterated by using as the reference angular position in (a) a current angular position of (b) of a previous iteration.

7. The method as claimed in claim 5, wherein,
the correcting angle is computed by an optimization method, or by a method of steepest descent of a fuel function defining the fuel flow rate of the turbine engine relative to the angular position of the blades.

8. The method as claimed in claim 5, wherein the value of the correcting angle is limited to limit occurrence of transients in the turbine engine.

* * * * *